(12) United States Patent
Webber et al.

(10) Patent No.: US 7,781,915 B2
(45) Date of Patent: Aug. 24, 2010

(54) APPARATUS AND METHOD FOR REMOTELY POWERING A DATA ACQUISITION OR UTILIZATION DEVICE

(75) Inventors: Harold H. Webber, Lafayette, CA (US); John R. Marum, Oakland, CA (US)

(73) Assignee: Tut Systems, Inc., Lake Oswego, OR (US)

( * ) Notice: Subject to any disclaimer, the term of this patent is extended or adjusted under 35 U.S.C. 154(b) by 572 days.

(21) Appl. No.: 11/695,772

(22) Filed: Apr. 3, 2007

(65) Prior Publication Data

US 2007/0247187 A1    Oct. 25, 2007

Related U.S. Application Data

(60) Provisional application No. 60/789,033, filed on Apr. 3, 2006.

(51) Int. Cl.
*H04B 3/00* (2006.01)
(52) U.S. Cl. ...................................................... 307/100
(58) Field of Classification Search ................ 307/100, 307/63, 64, 65; 370/315, 501
See application file for complete search history.

(56) References Cited

U.S. PATENT DOCUMENTS

| 5,299,195 | A | * | 3/1994 | Shah | 370/462 |
| 5,769,527 | A | * | 6/1998 | Taylor et al. | 362/85 |
| 6,175,556 | B1 | * | 1/2001 | Allen et al. | 370/293 |
| 7,215,660 | B2 | * | 5/2007 | Perlman | 370/338 |
| 7,349,325 | B2 | * | 3/2008 | Trzeciak et al. | 370/208 |
| 7,391,317 | B2 | * | 6/2008 | Abraham et al. | 340/531 |
| 2002/0106076 | A1 | | 8/2002 | Norrell et al. | |
| 2005/0034159 | A1 | | 2/2005 | Ophir et al. | |

* cited by examiner

*Primary Examiner*—Albert W Paladini

(57) ABSTRACT

Apparatus for delivering operating power from a data terminus to a utilization device includes a first data connection connecting the data terminus to a data repeater station and a second data connection connecting the data repeater station to the utilization device. A first power sourcing equipment delivers DC operating power to the data repeater station over a physical layer of the first data connection. A second power sourcing equipment at the repeater station receives operating power over the physical layer of the first data connection and delivers operating power over a physical layer of the second data connection to the utilization device.

4 Claims, 1 Drawing Sheet

APPARATUS AND METHOD FOR REMOTELY POWERING A DATA ACQUISITION OR UTILIZATION DEVICE

CROSS-REFERENCE TO RELATED APPLICATION

This application claims benefit of U.S. Provisional Application No. 60/789,033 filed Apr. 3, 2006, the entire disclosure of which is incorporated herein by reference.

BACKGROUND OF THE INVENTION

This invention relates to an apparatus and method for remotely powering a data acquisition or utilization device.

FIG. 1 shows a data terminus 11 and a data acquisition and utilization device 13. By way of example, let us consider the case in which the data acquisition and utilization device is a security camera for monitoring activity in the vicinity of the camera and the data terminus is at a central monitoring station. The central monitoring station transmits control data for controlling operation of the camera over an Ethernet connection, and the security camera transmits video data to the central monitoring station over the same Ethernet connection.

The Ethernet connection is implemented using the conventional PoE (power over Ethernet) physical infrastructure, including at least four UTPs, and in which the data terminus 11 is a power sourcing equipment and the security camera 13 is a powered device. The power sourcing equipment includes a DC power supply 12 and a data transceiver 14. The power supply 12 applies a DC voltage between two of the UTPs in known fashion. The security camera 13 includes a power supply (not separately shown) that recovers the DC power from the signals received over the Ethernet connection and employs the DC power to operate the camera.

Conventional PoE standards and practices limit the DC voltage that can be applied to the Ethernet connection by the power sourcing equipment 11 to about 48 volts and this limits the distance of the camera from the central monitoring station to about 100 meters. However, in many cases it would be desirable that the camera be at least 1000 meters from the central monitoring station.

SUMMARY OF THE INVENTION

In accordance with a first aspect of the invention there is provided apparatus for delivering operating power from a data terminus to a utilization device, comprising a first data connection connecting the data terminus to a data repeater station and having a physical layer, a second data connection connecting the data repeater station to the utilization device and having a physical layer, a first power sourcing equipment for delivering DC operating power to the data repeater station over the physical layer of the first data connection, and a second power sourcing equipment at the repeater station for receiving operating power over the physical layer of the first data connection and delivering operating power over the physical layer of the second data connection to the utilization device.

In accordance with a second aspect of the invention there is provided a method of operating a data terminus and a utilization device, comprising delivering operating power for a data repeater station over a first data connection connecting the data terminus to the data repeater station, delivering operating power for the utilization device over a second data connection connecting the data repeater station to the utilization device, delivering data from the data terminus to the utilization device over the first and second data connections via the repeater station, and delivering data from the utilization device to the data terminus over the second and first data connections via the repeater station.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
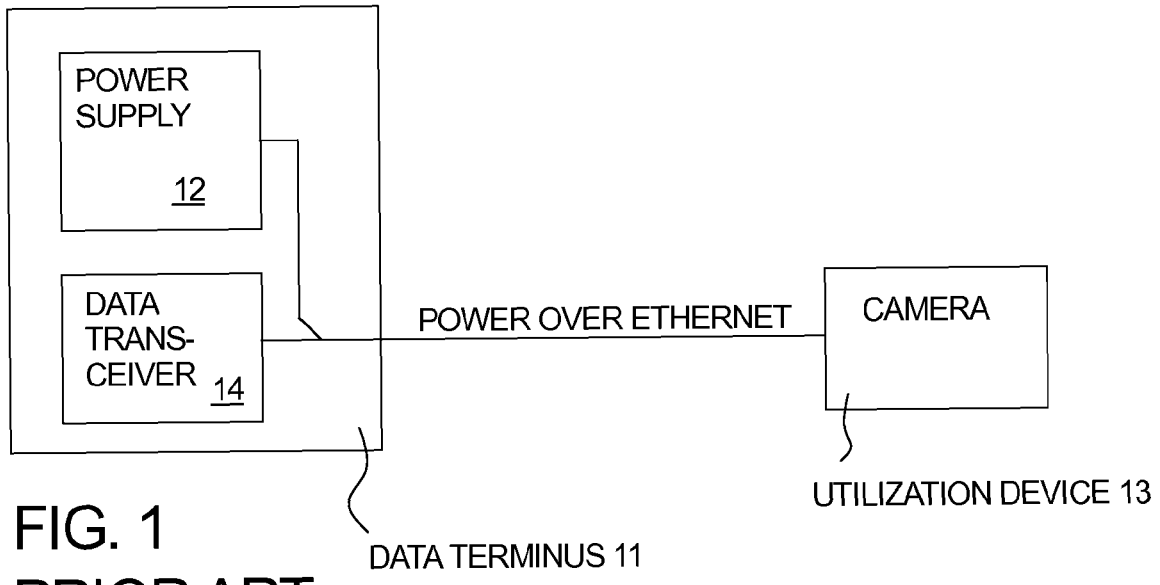
FIG. 1 is a block diagram illustrating a method and apparatus for delivering operating power to a data acquisition device.
Figure 2:
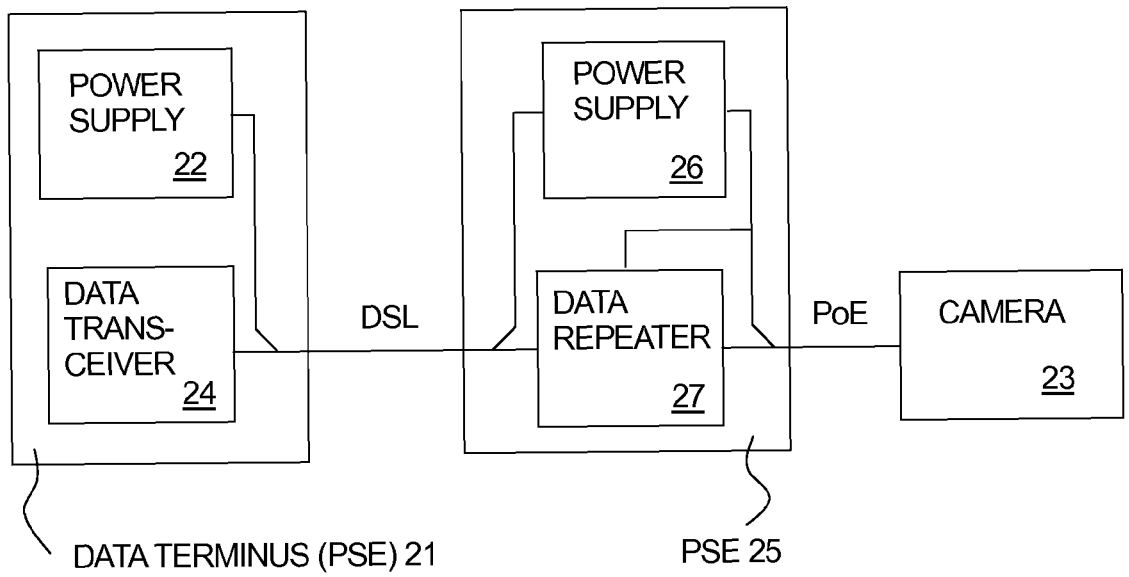
FIG. 2 is a block diagram illustrating an apparatus embodying the present invention.

FIG. 2 shows a data terminus or first power sourcing equipment 21 comprising a power supply 22 and a data transceiver 24, similarly to the power sourcing equipment shown in FIG. 1, a second power sourcing equipment 25 comprising a power supply 26 and a data repeater 27, and a powered data acquisition and/or utilization device, such as a security camera 23.

The first and second power sourcing equipments 21 and 25 are connected by a DSL connection whereas the second power sourcing equipment 25 is connected to the security camera 23 by an Ethernet connection. The data repeater 27 transmits and receives Ethernet data respectively to and from the security camera and transmits and receives DSL data respectively to and from the transceiver 24, The DSL connection is implemented using the conventional DSL physical infrastructure, including at least one UTP, wherein data transmitted by the data transceiver is in a different frequency band from data received by the data transceiver. The power supply 22 may apply a DC voltage as high as 144 volts between the conductors of the UTP. Thus, the first power sourcing equipment 21 transmits DC operating power over the DSL connection to the second power sourcing equipment.

The power supply 26 recovers DC power from the signals received over the DSL connection and both supplies operating power to the data repeater and applies DC voltage to the Ethernet connection for supplying DC operating power to the security camera 23.

Although the camera cannot be more than about 100 meters from the second power sourcing equipment, since the first power sourcing equipment can apply a voltage as high as 144 volts to the DSL connection the second power sourcing equipment to be 1500 meters or more from the first power sourcing equipment, depending on the power required to operate the second power sourcing equipment and the powered device. For example, for some low power devices the powered device may be more than 2.5 km from the first power sourcing equipment.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of the claims beyond the literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

The invention claimed is:

1. Apparatus for delivering operating power from a data terminus to a utilization device, comprising:
    a first data connection connecting the data terminus to a data repeater station and having a physical layer,
    a second data connection connecting the data repeater station to the utilization device and having a physical layer,
    a first power sourcing equipment for delivering DC operating power to the data repeater station over the physical layer of the first data connection, and
    a second power sourcing equipment at the repeater station for receiving operating power over the physical layer of the first data connection and delivering operating power over the physical layer of the second data connection to the utilization device.

2. Apparatus according to claim 1, wherein the first data connection is a DSL connection and the second data connection is an Ethernet connection.

3. A method of operating a data terminus and a utilization device, comprising:
    delivering operating power for a data repeater station over a first data connection connecting the data terminus to the data repeater station,
    delivering operating power for the utilization device over a second data connection connecting the data repeater station to the utilization device,
    delivering data from the data terminus to the utilization device over the first and second data connections via the repeater station, and
    delivering data from the utilization device to the data terminus over the second and first data connections via the repeater station.

4. A method according to claim 3, comprising delivering data between the utilization device and the repeater station over an Ethernet connection and delivering data between the repeater station and the data terminus over a DSL connection.

* * * * *